US012649862B2

(12) United States Patent
Murakami et al.

(10) Patent No.: US 12,649,862 B2
(45) Date of Patent: Jun. 9, 2026

(54) AQUEOUS INKJET INK COMPOSITION FOR TEXTILE PRINTING

(71) Applicant: SAKATA INX CORPORATION, Osaka (JP)

(72) Inventors: Masaki Murakami, Osaka (JP); Ryuta Noda, Osaka (JP); Hiroyuki Konishi, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 124 days.

(21) Appl. No.: 18/703,141

(22) PCT Filed: Jun. 28, 2022

(86) PCT No.: PCT/JP2022/025711
§ 371 (c)(1),
(2) Date: Apr. 19, 2024

(87) PCT Pub. No.: WO2023/074050
PCT Pub. Date: May 4, 2023

(65) Prior Publication Data
US 2024/0409764 A1      Dec. 12, 2024

(30) Foreign Application Priority Data

Oct. 28, 2021    (JP) ................................. 2021-176631
Mar. 31, 2022    (JP) ................................. 2022-057946

(51) Int. Cl.
*C09D 11/40*        (2014.01)
*B41J 2/01*         (2006.01)
(Continued)

(52) U.S. Cl.
CPC ................. *C09D 11/40* (2013.01); *B41J 2/01* (2013.01); *B41J 2/2107* (2013.01); *B41J 2/2114* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

2005/0036011 A1 *   2/2005   Watanabe ............ B41J 2/14209
                                                     347/71
2008/0262122 A1     10/2008   Ueno et al.
(Continued)

FOREIGN PATENT DOCUMENTS

CN        110591448 A     12/2019
CN        112552742 A      3/2021
(Continued)

OTHER PUBLICATIONS

Extended European Search Report (EESR) dated Sep. 19, 2025, issued for European counterpart patent application No. EP22886387.4 (9 pages).

(Continued)

*Primary Examiner* — Manish S Shah
(74) *Attorney, Agent, or Firm* — Law Office of Katsuhiro Arai

(57)                ABSTRACT

An aqueous inkjet ink composition for textile printing contains A to E: A. a pigment; B1. a solvent with a boiling point of 280° C. or higher; B2. as solvents with a boiling point of 200° C. or lower, a glycol ether accounting for 0.1 to 6.0% by mass, and a dihydric alcohol, wherein the ratio by mass of the solvent B1 and solvent B2, or B1/B2, is 0.3 to 3.0; C. a polyurethane resin-based water-dispersible resin; D. a surfactant; and E. a blocked isocyanate crosslinking agent accounting for 0.1 to 5.0% by mass. The aqueous inkjet ink composition is intended to have appropriate discharge property, which is capable of demonstrating superior image density and higher levels of washing fastness even when printed on cotton or polyester cloth, etc.

4 Claims, No Drawings

(51) Int. Cl.

| | | |
|---|---|---|
| *B41J 2/21* | (2006.01) | |
| *B41M 5/00* | (2006.01) | |
| *C09D 11/033* | (2014.01) | |
| *C09D 11/102* | (2014.01) | |
| *C09D 11/104* | (2014.01) | |
| *C09D 11/322* | (2014.01) | |
| *C09D 11/38* | (2014.01) | |
| *C09D 11/54* | (2014.01) | |
| *D06P 1/52* | (2006.01) | |
| *D06P 1/92* | (2006.01) | |
| *D06P 5/30* | (2006.01) | |

(52) U.S. Cl.
CPC .......... *B41J 2/2117* (2013.01); *C09D 11/033* (2013.01); *C09D 11/102* (2013.01); *C09D 11/104* (2013.01); *C09D 11/322* (2013.01); *C09D 11/38* (2013.01); *C09D 11/54* (2013.01); *D06P 1/5285* (2013.01); *D06P 1/928* (2013.01); *D06P 5/30* (2013.01); *B41M 5/0017* (2013.01); *B41M 5/0064* (2013.01)

(56) References Cited

U.S. PATENT DOCUMENTS

| | | | | |
|---|---|---|---|---|
| 2011/0200751 | A1* | 8/2011 | Yatake | C09D 11/54 |
| | | | | 977/773 |
| 2013/0158177 | A1* | 6/2013 | Ohzeki | C09D 11/40 |
| | | | | 524/561 |
| 2014/0240399 | A1* | 8/2014 | Saito | B41J 2/2103 |
| | | | | 347/44 |
| 2014/0375715 | A1* | 12/2014 | Kitada | B41J 2/04588 |
| | | | | 347/10 |
| 2015/0077480 | A1* | 3/2015 | Fujii | C09D 11/40 |
| | | | | 106/31.86 |
| 2016/0244626 | A1* | 8/2016 | Kagata | C09D 11/107 |
| 2017/0210919 | A1* | 7/2017 | Yoshimasa | C09D 11/322 |
| 2018/0058002 | A1* | 3/2018 | Ohashi | B41J 2/01 |
| 2018/0282567 | A1* | 10/2018 | Ishida | C09D 11/54 |
| 2019/0292390 | A1 | 9/2019 | Ohashi et al. | |

| | | | | |
|---|---|---|---|---|
| 2019/0382606 | A1 | 12/2019 | Iraqi et al. | |
| 2020/0165474 | A1 | 5/2020 | Nakamura et al. | |
| 2020/0207136 | A1* | 7/2020 | Miyasa | B41J 2/01 |
| 2021/0047531 | A1 | 2/2021 | Sato et al. | |
| 2022/0169875 | A1* | 6/2022 | Maruyama | C09D 11/54 |
| 2022/0177721 | A1* | 6/2022 | Ikoshi | C09D 11/037 |
| 2024/0166906 | A1 | 5/2024 | Murakami et al. | |

FOREIGN PATENT DOCUMENTS

| | | | |
|---|---|---|---|
| EP | 4317331 | A1 | 2/2024 |
| JP | 2000094825 | A | 4/2000 |
| JP | 2003268271 | A | 9/2003 |
| JP | WO2005116147 | A1 | 4/2008 |
| JP | 2009215506 | A | 9/2009 |
| JP | 2017179263 | A | 10/2017 |
| JP | 2018053172 | A | 4/2018 |
| JP | 2019035057 | A | 3/2019 |
| JP | 2019163397 | A | 9/2019 |
| JP | 2020506264 | A | 2/2020 |
| JP | WO2020080122 | A1 | 2/2021 |
| WO | 2019039411 | A1 | 2/2019 |
| WO | 2020080122 | A1 | 4/2020 |

OTHER PUBLICATIONS

International Preliminary Report on Patentability, dated Apr. 30, 2024, for corresponding international application PCT/JP2022/025711 (1 page).

Notification Concerning Transmittal of International Preliminary Report on Patentability, mailed May 10, 2024, for corresponding international application PCT/JP2022/025711 (1 page).

Notification of Transmittal of Translation of the International Preliminary Report on Patentability, mailed May 10, 2024, for corresponding international application PCT/JP2022/025711 (1 page).

Written Opinion of the International Searching Authority, mailed Sep. 13, 2022, for corresponding international application PCT/JP2022/025711 (5 pages).

International Search Report (ISR) mailed Sep. 13, 2022, issued for International application No. PCT/JP2022/025711. (3 pages).

* cited by examiner

AQUEOUS INKJET INK COMPOSITION FOR TEXTILE PRINTING

CROSS-REFERENCE TO RELATED APPLICATIONS

This application is the U.S. National Phase under 35 U.S.C. § 371 of International Application PCT/JP2022/025711, filed Jun. 28, 2022, which claims priority to Japanese Patent Application No. JP2021-176631, filed Oct. 28, 2021 and No. JP2022-057946, filed Mar. 31, 2022. The International Application was published under PCT Article 21 (2) in a language other than English.

TECHNICAL FIELD

The present invention relates to an aqueous inkjet ink composition for textile printing.

BACKGROUND ART

As described in Patent Literature 1, a white inkjet ink composition for textile printing, which is designed for printing on pretreated base materials and contains white pigments, water-dispersible urethane resins having reactivity to cationic compounds, crosslinking agents, water-soluble organic solvents containing glycol ethers having a solubility of 1 to 60 g in 100 g of water, and water, is publicly known.

As described in Patent Literature 2, an art of printing on fabrics using aqueous white inks containing two types of binder emulsions is publicly known.

As described in Patent Literature 3, it is publicly known that an ink set consisting of a specific alkaline ink composition and an acidic fixing composition, which is designed for printing on base bodies that have been stained with dyes, can demonstrate the effects of suppressing the movement of the dyes and providing excellent washing fastness.

As described in Patent Literature 4, it is publicly known that printing on cloths using an ink composition containing specific urethane resins, surfactants and specific organic solvents provides excellent washing fastness and rub resistance.

BACKGROUND ART LITERATURE

Patent Literature

Patent Literature 1: Japanese Patent Laid-open No. 2019-35057

Patent Literature 2: Japanese Patent Laid-open No. 2017-179263

Patent Literature 3: Published Japanese Translation of PCT Patent Laid-open No. 2020-506264

Patent Literature 4: International Patent Laid-open No. WO2020/080122

SUMMARY OF THE INVENTION

Problems to be Solved by the Invention

According to Patent Literature 1, the invention demonstrates certain effects on cotton as an ink composition for textile printing; however, whether or not any effects can be demonstrated on polyester is left unknown.

According to Patent Literatures 2 to 4, the inventions, when printed on fabrics, allow for printing in a manner offering a certain degree of washing fastness; however, obtaining the same effects on both cotton and polyester is not considered.

Hence, an object of the present invention is to obtain an aqueous inkjet ink composition for textile printing having appropriate discharge property, which is capable of demonstrating superior image density and higher levels of washing fastness even when printed on cotton and polyester cloths, etc.

Means for Solving the Problems

The inventors of the present invention found that the aforementioned object could be achieved by the aqueous inkjet ink composition for textile printing below, and eventually achieved the present invention as follows.

1. An aqueous inkjet ink composition for textile printing containing A to E below:

A. a pigment;

B1. a solvent with a boiling point of 280° C. or higher;

B2. a glycol ether accounting for 0.1 to 6.0% by mass relative to the total amount of the aqueous inkjet ink composition for textile printing, and a dihydric alcohol, as solvents with a boiling point of 200° C. or lower; wherein the ratio by mass of the solvent B1 and solvent B2, or B1/B2, is 0.3 to 3.0;

C. a polyurethane resin-based water-dispersible resin;

D. a surfactant; and

E. a blocked isocyanate crosslinking agent accounting for 0.1 to 5.0% by mass relative to the total amount of the aqueous inkjet ink composition for textile printing.

2. The aqueous inkjet ink composition for textile printing according to 1, which contains glycerin as the solvent B1, and contains propylene glycol as the dihydric alcohol being the solvent B2 and/or dipropylene glycol dimethyl ether as the glycol ether being the solvent B2.

3. The aqueous inkjet ink composition for textile printing according to 1 or 2, wherein the polyurethane resin-based water-dispersible resin is a polyester-based polyurethane resin.

4. An ink set having a pretreatment solution and the aqueous inkjet ink composition for textile printing according to any one of 1 to 3.

5. An inkjet printing method wherein a pretreatment solution and the aqueous inkjet ink composition for textile printing according to any one of 1 to 3 contact each other in liquid state.

Effects of the Invention

According to the present invention, an aqueous inkjet ink composition for textile printing having appropriate discharge property and allowing for textile printing that offers sufficient image density and excellent washing fastness can be obtained.

MODE FOR CARRYING OUT THE INVENTION

The present invention is an invention based on the following items, and this aqueous inkjet ink composition for textile printing is used for textile printing on textile products.

The present invention is as follows.

It should be noted that, in the Specification, "(meth) acrylate" refers to "acrylate and/or methacrylate," while "(meth)acrylic acid" refers to "acrylic acid and/or methacrylic acid."

Also, the aqueous inkjet ink composition for textile printing proposed by the present invention may sometimes be simply described as "ink composition."

<Ink Composition>

[A. Pigment]

The ink composition under the present invention is formulated as an ink composition of each color by containing a pigment of each hue.

For this pigment, any of pigments traditionally used in ink composition for textile printing may be used without specific limitations.

Organic pigments include, for example, dye lake pigments, azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, flavanthrone-based, quinophthalone-based, pyranthrone-based, indanthrone-based pigments, etc. Inorganic pigments include, for example, carbon black, titanium oxide, red iron oxide, graphite, iron black, chrome oxide green, aluminum hydroxide, etc.

Also, specific examples of the pigments are listed below.

Yellow pigments include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., where C. I. Pigment Yellow 14, 17, 150, 155, 180, 213, etc., are preferred.

Magenta pigments include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., where C. I. Pigment Red 122, 202, C. I. Pigment Violet 19, etc., are preferred.

Cyan pigments include, for example, C. I. Pigment Blue 1, 2, 3, 15, 15:1, 15:2, 15:3, 15:4, 15:6, 16, 18, 22, 27, 29, 60, etc., where C. I. Pigment Blue 15:3, 15:4, etc., are preferred.

Black pigments for using the present invention as a black ink composition include, for example, carbon black (C. I. Pigment Black 7), etc.

White pigments for using the present invention as a white ink composition include, for example, titanium oxide, aluminum oxide, etc., where titanium oxide that has been surface-treated with alumina, silica, or any of various other materials is preferred.

The content of the pigment in the ink composition is preferably 1.0 to 20.0% by mass relative to the total mass of the ink composition. If the pigment content is under 1.0% by mass, the quality of the obtained images may drop. If it exceeds 20.0% by mass, on the other hand, the viscometric property of the ink composition may be negatively affected.

Also, the surface of the pigment particles may or may not be coated with a resin. Additionally, if coated with a resin, the resin may or may not be alkali-soluble.

(Pigment Dispersant)

The ink composition under the present invention may contain pigment dispersants as necessary.

The pigment dispersants are used to improve dispersibility of the pigment and storage stability of the ink composition proposed by the present invention, and while any conventionally used pigment dispersants can be used without specific limitations, preferably polymeric dispersants are used in particular. Such pigment dispersants include, for example, carbodiimide-based dispersants, polyester amine-based dispersants, fatty acid amine-based dispersants, modified polyacrylate-based dispersants, modified polyurethane-based dispersants, multichain polymeric nonionic-based dispersants, polymeric ionic activators, etc. Any of these pigment dispersants may be used alone, or two or more types may be combined.

The acid value of any such polymeric dispersant is preferably 100 mgKOH/g or higher, or more preferably 150 mgKOH/g or higher, or yet more preferably 200 mgKOH/g or higher, in the interest of improving the dispersibility.

In particular, acid-modified polyacrylate-based dispersants are preferred, styrene-alkyl acrylate-(meth)acrylic acid copolymers are more preferred, and styrene-lauryl acrylate-acrylic acid copolymers are yet more preferred.

Preferably the aforementioned pigment dispersants are contained by 1 to 200 parts by mass relative to 100 parts by mass representing the total amount of pigment used. If the content of the pigment dispersants is under 1 part by mass, dispersibility of pigment and storage stability of the ink composition proposed by the present invention may drop. On the other hand, while they can be contained by over 200 parts by mass, doing so may not produce any difference in the effects. A more preferred lower limit of the content of the pigment dispersants is 5 parts by mass, while a more preferred upper limit is 60 parts by mass.

[B1. Solvent with Boiling Point of 280° C. or Higher]

Solvents with a boiling point of 280° C. or higher include glycerin, triethylene glycol, benzyl benzoate, triethanolamine, triisopropanolamine, etc., of which preferably glycerin is selected.

The content of the solvent with a boiling point of 280° C. or higher in the total amount of the ink composition is preferably 2.0% by mass or higher, or more preferably 3.0% by mass or higher, or yet more preferably 4.0% by mass or higher, or most preferably 5.0% by mass or higher, on the condition that the solvent is compatible with the ink composition. Also, it is preferably 20.0% by mass or lower, or more preferably 17.0% by mass or lower, or yet more preferably 14.0% by mass or lower.

[B2. Specific Solvents with Boiling Point of 200° C. or Lower]

The present invention uses, among solvents with a boiling point of 200° C. or lower, a glycol ether by 0.1 to 6.0% by mass relative to the total amount of the aqueous inkjet ink composition for textile printing, and a dihydric alcohol.

The glycol ether may be ethylene glycol monomethyl ether, ethylene glycol monoethyl ether, ethylene glycol mono-n-propyl ether, ethylene glycol isopropyl ether, ethylene glycol mono-n-butyl ether, ethylene glycol t-butyl ether, ethylene glycol isobutyl ether, ethylene glycol dimethyl ether, ethylene glycol diethyl ether, propylene glycol monomethyl ether, propylene glycol monoethyl ether, propylene glycol-n-propyl ether, propylene glycol monobutyl ether, propylene glycol dimethyl ether, 3-methoxy-3-methyl-1-butanol or other (mono or di) alkyl ether of glycol.

Also, it may be diethylene glycol monomethyl ether, diethylene glycol monoethyl ether, diethylene glycol dimethyl ether, diethylene glycol diethyl ether, dipropylene glycol monomethyl ether, dipropylene glycol dimethyl ether, diethylene glycol ethyl methyl ether, dipropylene glycol mono-n-butyl ether or other (mono or di) alkyl ether of dialkylene glycol.

The dihydric alcohol may be ethylene glycol, propylene glycol, 1,2-butanediol, etc.

The total content of the glycol ether and dihydric alcohol with a boiling point of 200° C. or lower, in the total amount of the ink composition, is preferably 8.0% by mass or higher, or more preferably 10.0% by mass or higher, or yet more preferably 11.0% by mass or higher, on the condition that each solvent is compatible with the ink composition. Also, it is preferably 20.0% by mass or lower, or more preferably 18.0% by mass or lower, or yet more preferably 16.0% by mass or lower.

In the above, the content of the glycol ether with a boiling point of 200° C. or lower in the total amount of the ink composition is 0.1 to 6.0% by mass. Additionally, it is preferably 0.5% by mass or higher, or more preferably 0.8% by mass or higher, or yet more preferably 1.5% by mass or higher, or most preferably 2.0% by mass or higher. Also, it is preferably 5.0% by mass or lower, or more preferably 4.0% by mass or lower, or yet more preferably 3.5% by mass or lower. If a glycol ether with a boiling point of 200° C. or lower is not contained or is contained by under 0.1% by mass, washing fastness will worsen. Also, a content exceeding 6.0% by mass will lead to poor discharge stability.

Meanwhile, the content of the dihydric alcohol with a boiling point of 200° C. or lower in the total amount of the ink composition is preferably 1.0% by mass or higher, or more preferably 3.0% by mass or higher, or yet more preferably 5.0% by mass or higher, or most preferably 7.0% by mass or higher. Also, it is preferably 20% by mass or lower, or more preferably 17.0% by mass or lower, or yet more preferably 14.0% by mass or lower, or most preferably 11.0% by mass or lower. By containing these glycol ether and dihydric alcohol with a boiling point of 200° C. or lower, the ink composition can achieve improved washing fastness.

Furthermore, the ratio by mass of the aforementioned solvent B1 and solvent B2, or B1/B2, is 0.3 to 3.0; in particular, it is preferably 0.4 or higher, or more preferably 0.5 or higher, or yet more preferably 0.6 or higher. Also, it is preferably 2.5 or lower, or more preferably 1.8 or lower, or yet more preferably 1.3 or lower. If this ratio by mass B1/B2 is lower than 0.3, the inkjet ink composition will have poor discharge property, while a ratio higher than 3.0 leads to lower washing fastness.

(Other Solvents)

Under the present invention, other solvents as listed below may be contained to the extent that the effects of the present invention are not impaired; however, they may not be contained.

Glycol ethers and dihydric alcohols with a boiling point exceeding 200° C. but under 280° C. include ethylene glycol monophenyl ether, ethylene glycol monoethyl ether, ethylene glycol monobutyl ether, diethylene glycol monobutyl ether, diethylene glycol dibutyl ether, diethylene glycol butyl methyl ether, triethylene glycol monomethyl ether, triethylene glycol monobutyl ether, triethylene glycol dimethyl ether, triethylene glycol butyl methyl ether, tripropylene glycol dimethyl ether, tetraethylene glycol dimethyl ether, dipropylene glycol mono-n-propyl ether and other glycol ethers.

Also included are diethylene glycol, tetraethylene glycol, dipropylene glycol, tripropylene glycol, 1,3-butylene glycol, 1,4-butylene glycol, 1,2-pentanediol, 1,2-hexanediol, 1,6-hexanediol, neopentyl glycol, 1,2-cyclohexanediol, heptanediol, 1,8-octanediol, etc.

Solvents other than glycol ethers and dihydric alcohols with a boiling point under 280° C. include those selected from monohydric alcohols, alkyl ether acetates of glycols, ketones, ethers, esters, nitrogen-containing compounds, etc. Any of these may be used alone, or two or more types may be combined.

The monohydric alcohols include methanol, ethanol, isopropanol, n-propanol, isobutanol, n-butanol, n-pentanol, n-hexanol, n-heptanol, n-octanol, n-nonyl alcohol, n-decanol, and isomers thereof, cyclopentanol, cyclohexanol, benzyl alcohol, etc.

The alkyl ether acetates of glycols include ethylene glycol monomethyl ether acetate, ethylene glycol monoethyl ether acetate, diethylene glycol monoethyl ether acetate, ethylene glycol monobutyl ether acetate, etc.

The ketones include acetone, methyl ethyl ketone, methyl isobutyl ketone, diisobutyl ketone, cyclohexanone, diacetone alcohol, etc.

The ethers include 1,3-dioxolane, 1,4-dioxane, diethyl ether, tetrahydrofuran, diethylene glycol butyl methyl ether, etc.

The esters include methyl acetate, ethyl acetate, butyl acetate, isopropyl acetate, n-propyl acetate, ethyl lactate, ethylene glycol monomethyl ether acetate, tripropylene glycol dimethyl ether, diethylene glycol monobutyl ether, ethylene glycol monophenyl ether, triethylene glycol monomethyl ether, tetraethylene glycol dimethyl ether, etc.

The nitrogen-containing compounds include monoethanolamine, diethanolamine, monoisopropanolamine, diisopropanolamine, N-methyl-ethanolamine, N-methyl-diethanolamine, N-methyl-2-pyrrolidone, N,N-dimethyl formamide, etc.

[C. Polyurethan Resin-Based Water-Dispersible Resin]

The polyurethane resin-based water-dispersible resins that can be used under the present invention include polyester-based polyurethane resins, polyether-based polyurethane resins, polyether ester-based polyurethane resins, and polycarbonate-based polyurethane resins. In particular, polyester-based polyurethane resins are preferred.

The polyurethane resin used here is preferably an anionic polyurethane resin, which is a reaction product of a polyisocyanate compound and one or more types of polyol compounds and polyamine compounds based on polyester, polylactone, polycarbonate, and polyether/polycarbonate, of which an anionic polyester-based polyurethane resin is preferred.

Furthermore, for the purpose of the present invention, the resin's 100% modulus (measured based on DIN 53504) is preferably 0.5 to 10.0 MPa.

Specific examples of the polyester-based polyurethane resins include SUPERFLEX 210 (anionic polyester-based polyurethane resin), SUPERFLEX 300 (anionic polyester-based polyurethane resin), SUPERFLEX 500M (nonionic polyester-based polyurethane resin) (all by DKS Co., Ltd.), IMPRANIL DLP1380 (anionic polyester-based polyurethane resin), IMPRANIL DLN-W50 (polyurethane resin), IMPRANIL DLU (polyurethane resin), IMPRANIL DLP-R (sulfonic acid group-containing polyester-based polyurethane resin), BAYBOND PU407 (anionic polyester-based polyurethane resin) (all by Sumika Covestro Urethane Co., Ltd.), etc.

(Other Resins)

The aqueous inkjet ink composition for textile printing proposed by the present invention may contain other resins besides the aforementioned polyurethane resin-based water-dispersible resins, to the extent that the effects of the present invention are not impaired.

For example, when preparing beforehand a resin varnish containing the aforementioned pigment in order to obtain the ink composition, an alkali-soluble resin that can be dissolved in alkaline aqueous solvents can be used. Such alkali-soluble resin is preferably one containing one type, or two or more types, of anionic groups such as carboxyl group, sulfonic acid group, phosphonic acid group ($-P(=O$ $(OH_2)$), etc.

In addition, preferably the alkali-soluble resin has long-chain alkyl groups, alicyclic or aromatic cyclic hydrocarbon groups or other hydrophobic groups as hydrophobic parts for improving the adsorptivity primarily with respect to the pigment.

By blending in an alkali-soluble resin, bleeding of the ink composition in printed areas can be prevented.

The acid value of the alkali-soluble resin is preferably 100 mgKOH/g or higher, or more preferably 140 mgKOH/g or higher, from the viewpoint of increasing its solubility in the aqueous media. Also, the acid value of the alkali-soluble resin is preferably 300 mgKOH/g or lower, or more preferably 250 mgKOH/g or lower, from the viewpoint of improving the water resistance of the printed matters. It should be noted that the acid value is a theoretical acid value indicating how many milligrams of potassium hydroxide are theoretically needed to neutralize 1 gram of the alkali-soluble resin, calculated arithmetically based on the compounding makeup of the monomers used to synthesize the alkali-soluble resin.

The glass transition temperature of the alkali-soluble resin is preferably 0° C. or higher, or more preferably 10° C. or higher, from the viewpoint of improving storage stability and discharge stability of the ink composition. The glass transition temperature of the alkali-soluble resin is preferably 100° C. or lower, or more preferably 80° C. or lower, from the viewpoint of improving the texture of the printed matters.

The glass transition temperature of the alkali-soluble resin, if the alkali-soluble resin is an acrylic-based copolymer resin, represents a theoretical glass transition temperature obtained according to Wood's equation below:

$$\text{Wood's equation: } 1/Tg = W1/Tg1 + W2/Tg2 + W3/Tg3 + \ldots + Wx/Tgx$$

[In the formula, Tg1 to Tgx represent the glass transition temperatures of homopolymers comprising the alkali-soluble resin's constituent monomers 1, 2, 3, . . . , x, respectively, W1 to Wx represent the polymerization ratios of monomers 1, 2, 3, . . . , x, respectively, and Tg represents the theoretical glass transition temperature. It should be noted that, in Wood's equation, glass transition temperatures are absolute temperatures.]

The glass transition temperature of the alkali-soluble resin, if the alkali-soluble resin is other than an acrylic-based copolymer resin, represents a measured glass transition temperature obtained by thermal analysis. The method for thermal analysis conforms to JIS K 7121 (Testing Methods for Transition Temperatures of Plastics) and, as an example, the glass transition temperature can be measured using the Pyris 1 DSC manufactured by PerkinElmer, Inc., under the conditions of 20° C./min in rate of temperature rise and 20 mL/min in flow rate of nitrogen gas.

The weight-average molecular weight of the alkali-soluble resin is preferably 5,000 or higher, or more preferably 10,000 or higher, from the viewpoint of improving water resistance of the printed matters. The weight-average molecular weight of the alkali-soluble resin is preferably 100,000 or lower, or more preferably 50,000 or lower, from the viewpoint of increasing its solubility in the aqueous media.

The weight-average molecular weight can be measured according to the gel permeation chromatography (GPC) method. As an example, a chromatography is performed using the Waters 2690 (manufactured by Waters Corp.) as a GPC system, PLgel 5 µm MIXED-D (manufactured by Polymer Laboratories Inc.) as a column, tetrahydrofuran as a developing solvent, and an RI detector, under the conditions of 25° C. in column temperature, 1 mL/min in flow rate, 10 mg/mL in sample injection concentration, and 100 µL in injection volume, to obtain a weight-average molecular weight in terms of polystyrene.

The alkali-soluble resin may be, for example, an acrylic-based copolymer resin, maleic acid-based copolymer resin, polyester resin obtained by condensation polymerization reaction, polyurethane resin, etc. The materials from which to synthesize such alkali-soluble resin are disclosed in Japanese Patent Laid-open No. 2000-94825, for example, and acrylic-based copolymer resins, maleic acid-based copolymer resins, polyester-based resins, polyurethane-based resins, etc., obtained using the materials described in the laid-open publication can be utilized. Furthermore, resins obtained using other materials besides the above can also be utilized. Any of the foregoing alkali-soluble resins may be used alone, or two or more types may be combined. It should be noted that the aforementioned pigment dispersants, which are also alkali-soluble resins, may also be used.

If an alkali-soluble resin is contained in the aqueous inkjet ink composition for textile printing proposed by the present invention, the content of the alkali-soluble resin in the entire aqueous inkjet ink composition for textile printing proposed by the present invention is preferably 0.2% by mass or higher, or more preferably 0.4% by mass or higher, in solids content of the alkali-soluble resin. Particularly when the ink composition represents a colored ink that is not white, bleeding of the printed textile products can be further prevented if an alkali-soluble resin is contained by 0.4% by mass or more.

For the acrylic-based copolymer resins, those obtained by polymerizing a mixture of anionic group-containing monomers and other monomers copolymerizable therewith, in a solvent and in the presence of a standard radical-generating agent (for example, benzoyl peroxide, tertiary butyl peroxybenzoate, azobisisobutyronitrile, etc.) may be used.

The anionic group-containing monomers include, for example, monomers having anionic group of at least one type selected from the group that consists of carboxyl group, sulfonic acid group, and phosphonic acid group, of which monomers having carboxyl groups are particularly preferred.

The monomers having carboxyl groups include, for example, acrylic acid, methacrylic acid, crotonic acid, itaconic acid, maleic acid, fumaric acid, 2-carboxyethyl (meth)acrylate, 2-carboxypropyl (meth)acrylate, maleic acid anhydride, fumaric acid anhydride, maleic acid half ester, etc. Also, the monomers having sulfonic acid groups include, for example, sulfoethyl methacrylate, etc. Also, the monomers having phosphonic acid groups include, for example, phosphonoethyl methacrylate, etc.

For the other monomers copolymerizable with anionic group-containing monomers, preferably hydrophobic group-containing monomers are contained from the viewpoint of improving the adsorptivity with respect to the pigment.

The hydrophobic group-containing monomers include, for example, monomers having long-chain alkyl groups including alkyl esters of (meth)acrylic acids or other radically polymerizable unsaturated carboxylic acids with 8 or more carbon atoms (for example, 2-ethylhexyl (meth)acrylate, octyl (meth)acrylate, lauryl (meth)acrylate, stearyl (meth)acrylate, 2-hydroxystearyl (meth)acrylate, etc.), alkyl vinyl ethers with 8 or more carbon atoms (for example, dodecyl vinyl ether, etc.), and vinyl esters of fatty acids with 8 or more carbon atoms (for example, vinyl 2-ethylhexanoate, vinyl laurate, vinyl stearate, etc.); monomers having alicyclic hydrocarbon groups including cyclohexyl (meth) acrylate, etc.; and monomers having aromatic hydrocarbon groups including benzyl (meth)acrylate, styrene, α-methyl styrene, vinyl toluene, and other styrene-based monomers, etc. Any of the foregoing hydrophobic group-containing monomers may be used alone, or two or more types may be combined.

For the other monomers copolymerizable with anionic group-containing monomers, hydrophilic group-containing monomers may be contained from the viewpoint of suppressing cohesion of the alkali-soluble resin in the aqueous media.

The hydrophilic group-containing monomers include, for example, monomers having (poly)oxyalkylene chains including, for example, esterified products of methoxypolyethylene glycol, methoxypolyethylene polypropylene glycol, ethoxypolyethylene glycol, ethoxypolyethylene polypropylene glycol, propoxypolyethylene glycol, propoxypolyethylene polypropylene glycol or other single-end alkyl-capped (poly)alkylene glycol and (meth)acrylic acid or other radically polymerizable unsaturated carboxylic acid, ethylene oxide adducts and/or propylene oxide adducts to (meth)acrylic acids or other radically polymerizable unsaturated carboxylic acids, etc.; basic group-containing monomers including, for example, 1-vinyl-2-pyrrolidone, 1-vinyl-3-pyrrolidone and other vinylpyrrolidones, 2-vinylpyridine, 4-vinylpyridine, 5-methyl-2-vinylpyridine, 5-ethyl-2-vinylpyridine, and other vinylpyridines, 1-vinylimidazole, 1-vinyl-2-methylimidazole, and other vinylimidazoles, 3-vinylpiperidine, N-methyl-3-vinylpiperidine, and other vinylpiperidines, dimethylaminoethyl (meth) acrylate, diethylaminoethyl (meth)acrylate, (meth)acrylic acid tert-butylaminoethyl, (meth)acrylamide, N-methylol (meth)acrylamide, N-butoxymethyl(meth)acrylamide, N-methoxy(meth)acrylamide, N-ethoxy(meth)acrylamide, N-dimethylacrylamide, N-propylacrylamide, and other nitrogen-containing derivatives of (meth)acrylic acids; monomers having hydroxyl groups including, for example, hydroxyethyl (meth)acrylate, hydroxypropyl (meth)acrylate, and other hydroxyalkyl esters of (meth)acrylic acids; and monomers having epoxy groups including, for example, glycidyl (meth)acrylate, etc. Any of the foregoing hydrophilic group-containing monomers may be used alone, or two or more types may be combined.

The other copolymerizable monomers besides the hydrophobic group-containing monomers and hydrophilic group-containing monomers include, for example, alkyl esters of (meth)acrylic acids with less than 8 carbon atoms, such as methyl (meth)acrylate, ethyl (meth)acrylate, propyl (meth) acrylate, isopropyl (meth)acrylate, butyl (meth)acrylate, hexyl (meth)acrylate, etc. Any of the foregoing other copolymerizable monomers besides the hydrophobic group-containing monomers and hydrophilic group-containing monomers may be used alone, or two or more types may be combined.

The alkali-soluble resin may use bi- or higher-functional crosslinking agents from the viewpoint of crosslinking the resin to an appropriate degree and thereby suppressing pigment cohesion.

It suffices that the bi- or higher-functional crosslinking agents are those having two or more reactive functional groups in the molecule in order to react with the functional groups of the alkali-soluble resin. The reactive functional groups include, for example, epoxy groups, hydroxyl groups, isocyanate groups, amino groups, aziridine groups, etc. Any of the foregoing bi- or higher-functional crosslinking agents may be used alone, or two or more types may be combined.

[D. Surfactant]

Preferably the surfactant contained is any of nonionic-based surfactants and/or amphoteric surfactants.

The nonionic-based surfactants include one type, or two or more types, selected from silicone-based surfactants, fluorine-based surfactants, and acetylene-based surfactants.

The silicone-based surfactants include SILFACE SAG001, SILFACE SAG002, SILFACE SAG003, SILFACE SAG005, SILFACE SAG503A (all by Nissin Chemical Industry Co., Ltd.), where polyether-modified silicones are preferred.

Also included are polyether-modified polydimethylsiloxanes, etc., such as BYK-300, BYK-302, BYK-306, BYK-307, BYK-330, BYK-333, BYK-347, BYK-377, BYK-3455 and BYK-3456 (all by BYK-Chemie Japan K.K.).

The fluorine-based surfactants include, for example, F-410, F-444, F-553 (all by DIC Corporation), FS-65, FS-34, FS-35, FS-31, FS-30 (all by DuPont de Nemours, Inc.), etc.

The acetylene-based surfactants include, for example, one type, or two or more types, selected from those commercially available under the product names of SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, SURFYNOL 440, SURFYNOL 465 (all by EVONIK Industries AG), DYNOL 607, DYNOL 609, OLFINE E1004, OLFINE E1010, OLFINE E1020, OLFINE PD-001, OLFINE PD-002W, OLFINE PD-004, OLFINE PD-005, OLFINE EXP. 4001, OLFINE EXP. 4200, OLFINE EXP. 4123, OLFINE EXP. 4300 (all by Nissin Chemical Industry Co., Ltd.), etc. In particular, those based on polyoxyethylene-added acetylene glycol ethers are preferred.

The amphoteric surfactants include lauric acid amidopropyl betaine, lauryl betaine, cocamidopropyl betaine, stearyl betaine, alkyldimethylamino acetic acid betaine, and other alkyl betaine-based surfactants, lauryl dimethylamine oxide, and other alkylamine oxide-based surfactants, etc.

More specifically, they include AMPHITOL 20AB, AMPHITOL 20BS, AMPHITOL 24B, AMPHITOL 55AB, AMPHITOL 86B, AMPHITOL 20Y-B, AMPHITOL 20N (all by Kao Corporation), etc.

Of these surfactants, preferably acetylene-based surfactants, silicone-based surfactants, and amphoteric surfactants are all contained.

The total content of surfactants in the ink composition is preferably 0.1% by mass or higher, or more preferably 0.2% by mass or higher, or yet more preferably 0.3% by mass or higher. Also, it is preferably 2.0% by mass or lower, or more preferably 1.0% by mass or lower, or yet more preferably 0.6% by mass or lower.

[E. Crosslinking Agent]

By containing a crosslinking agent, the ink composition proposed by the present invention can achieve improved washing fastness. In particular, a blocked isocyanate crosslinking agent is contained by 0.1 to 5.0% by mass relative to the total amount of the aqueous inkjet ink composition for textile printing in view of excellent solidification property and washing fastness.

The blocked isocyanate crosslinking agent is a polyisocyanate compound whose active isocyanate groups have been reacted with a phenol or other blocking agent and thereby inactivated beforehand. A blocked isocyanate cannot initiate crosslinking reaction, and remains chemically stable in its original state; it will enter a state of enabling crosslinking reaction once the blocking groups bonded with the isocyanate groups are dissociated by means of thermal treatment, etc., and active isocyanate groups are formed.

Preferably the compound that constitutes the polyisocyanate part of the blocked isocyanate crosslinking agent is a diisocyanate compound, triisocyanate compound, or polyisocyanate compound, such as hexamethylene diisocyanate, trimethyl hexamethylene diisocyanate, hexamethylene triisocyanate, lysine ester triisocyanate, isophorone diisocyanate, hydrogenated xylylene diisocyanate, toluene diisocyanate, xylene diisocyanate, diphenylmethane diisocyanate, etc., for example. Of these, a triisocyanate compound, such as trisbiuret-modified product of hexamethylene diisocyanate or other modified product of hexamethylene diisocyanate, for example, is more preferred.

Such compound that constitutes the polyisocyanate part may be a polyisocyanate compound having two or more isocyanate groups per molecule, such as diisocyanate compound, triisocyanate compound, tetraisocyanate compound, pentaisocyanate compound, hexaisocyanate compound, or any of various polyisocynate compounds, for example. Specific examples of the polyisocyanate compounds include tolylene diisocyanate, xylylene diisocyanate, diphenylmethane diisocyanate, biphenyl diisocyanate, 3,3'-dimethyl-4,4'-biphenylene diisocyanate, methylene bis(phenyl isocyanate), isophorone diisocyanate, and other aromatic polyisocyanates, hydrogenated tolylene diisocyanate, hydrogenated xylylene diisocyanate, hydrogenated diphenylmethane diisocyanate, and other alicyclic polyisocyanates, 1,4-tetramethylene diisocyanate, hexamethylene diisocyanate, 2,2,4-trimethylhexamethylene diisocyanate, and other aliphatic polyisocyanates, etc. The blocked isocyanate under the present invention may be constituted by one type of polyisocyanate compound, or by multiple types of polyisocyanate compounds. From the viewpoint of further facilitating the curing of the ink composition, preferably a triisocyanate compound is contained as a polyisocyanate compound that constitutes the blocked isocyanate under the present invention.

The blocking agent pertaining to the blocked isocyanate crosslinking agent is not specifically limited. Other than the phenol mentioned above, cresol, ethyl phenol, butyl phenol, 2-hydroxypyridine, dimethyl malonate, diethyl malonate, methyl acetoacetate, ethyl acetoacetate, acetyl acetone, butyl mercaptan, dodecyl mercaptan, acetanilide, amide acetate, ε-caprolactam, δ-valerolactam, γ-butyrolactam, succinimide, maleimide, imidazole, 2-methyl imidazole, urea, thiourea, ethylene urea, formaldoxime, acetaldoxime, acetone oxime, methyl ethyl ketoxime, methyl isobutyl ketoxime, cyclohexanone oxime, carbazole, dimethyl pyrazole, triazole, etc., may be used. The blocked isocyanate compound under the present invention may be constituted by one type of blocking agent, or by multiple types of blocking agents. Also, the combination of blocking agent and polyisocyanate compound is not specifically limited, either, and multiple combinations may be available, and the blocked isocyanate crosslinking agent under the present invention may be constituted by multiple types of compounds.

Preferably the blocked isocyanate crosslinking agent is of thermal decomposition type. When the blocked isocyanate crosslinking agent is of thermal decomposition type, the temperature at which a notable dissociation reaction of the blocking agent, or deblocking reaction, occurs (hereinafter referred to as "deblocking temperature") can be adjusted according to the type of the blocking agent, type of the polyisocyanate compound to be blocked, etc. The specific level of this deblocking temperature is not particularly limited, but if the temperature is 70 to 130° C., for example, the aqueous inkjet ink composition for textile printing that contains the blocked isocyanate compound having this deblocking temperature presents a low, or virtually zero, crosslinking point density prior to crosslinking. However, by promoting the crosslinking reaction and thereby forming crosslinked structures, the crosslinking density can be increased.

The content percentage of the crosslinking agent relative to the total amount of the ink composition proposed by the present invention is 0.1 to 5.0% by mass. In particular, it is preferably 0.5% by mass or higher, or more preferably 1.0% by mass or higher, or yet more preferably 1.5% by mass or higher. Also, it is preferably 4.5% by mass or lower, or more preferably 4.0% by mass or lower, or yet more preferably 3.5% by mass or lower. If it is under 0.1% by mass, washing fastness may drop, while exceeding 5.0% by mass may lead to lower discharge property.

(Other Crosslinking Agents)

Other crosslinking agents may be used together with the aforementioned crosslinking agent to the extent that the effects of the present invention are not impaired. For such other crosslinking agents, oxazoline group-containing water-soluble acrylic resins, etc., may be adopted, for example.

(Other Components)

The aqueous inkjet ink composition for textile printing proposed by the present invention may contain UV absorbents, antioxidants, defoaming agents, storability improving agents, antifungal agents, rustproofing agents, thickening agents, humectants, pH-adjusting agents, and various other types of additives, as other components.

(UV Absorbent)

The UV absorbents include benzophenone-based UV absorbents, benzotriazole-based UV absorbents, salicylate-based UV absorbents, hydroxyphenyl triazine-based UV absorbents, cyanoacrylate-based UV absorbents, nickel complex salt-based UV absorbents, etc.

(Antioxidant)

The antioxidants include phenol-based antioxidants, amine-based antioxidants, sulfur-based antioxidants, phosphorus-based antioxidants, etc.

(Defoaming Agent)

The defoaming agents include silicone-based defoaming agents, Pluronic (registered trademark)-based defoaming agents, etc.

(Method for Preparing Ink Composition)

<Method for Preparing Ink Composition>

The method for preparing (manufacturing) the ink composition is not specifically limited, and simply the aforementioned components can be added in order, or all at once, and mixed together. Examples include (1) a method whereby an aqueous resin varnish constituted by an alkali-soluble resin dissolved in water in the presence of a basic compound, if necessary, is mixed with the pigment, and if necessary, pigment dispersant, etc., after which any of various types of dispersion machines such as ball mill, attritor, roll mill, sand mill, agitator mill, etc., is used to prepare a pigment-dispersed liquid (ink base), to which the remaining materials are added further, to prepare the ink composition; and (2) a method whereby the pigment is dispersed according to the aforementioned method and then the acid precipitation method, ion-exchange means described in Domestic Re-publication of International Patent Laid-open No. WO2005/116147, etc., is used to obtain a resin-coated pigment comprising the pigment and the alkali-soluble resin precipitated on its surface, after which the obtained resin-coated pigment is neutralized with a basic compound and redispersed in water using any of various types of dispersion machines (high-speed agitation device, etc.), to which the remaining materials are added further, to prepare the ink composition.

The ink composition has an initial post-manufacturing viscosity in a range of 2.0 to 25.0 mPa·s, or preferably 5.0 to 20.0 mPa·s. Viscosity can be measured using a type-E viscometer (product name RE100L Viscometer, manufactured by Toki Sangyo Co., Ltd.), for example.

<Pretreatment Solution>

The pretreatment solution under the present invention serves to reliably fix on a printing target a print layer constituted by the aqueous inkjet ink composition for textile printing proposed by the present invention, by forming a pretreatment layer on the printing target before the print layer is formed.

The pretreatment solution, as a rule, is an aqueous solution containing an acid component and/or salt thereof, and a basic substance as a pH-adjusting agent.

(Acid)

For the acid, any organic acid, inorganic acid, or alkaline metal salt or alkaline earth metal salt thereof, may be used. These acids and salts thereof may also be hereinafter referred to collectively as "acid compounds."

Among the organic acids, formic acid, acetic acid, propionic acid, butyric acid, citric acid, lactic acid, and other carboxylic acids are preferred, of which formic acid, acetic acid, or other organic acid with a boiling point of 120° C. or lower under 1 atm is particularly preferred. For this organic acid with a boiling point of 120° C. or lower, formic acid (boiling point 100.8° C. under 1 atm) and/or acetic acid (boiling point 118° C. under 1 atm) may be used. Additionally, sodium salt, potassium salt, magnesium salt, calcium salt, ammonium salt, or other salt of formic acid or acetic acid may also be used.

The content of such acid compound in the pretreatment solution is preferably 2.0% by mass or higher, or more preferably 3.0% by mass or higher, or yet more preferably 3.5% by mass or higher. Also, it is preferably 10.0% by mass or lower, or more preferably 8.0% by mass or lower, or yet more preferably 7.0% by mass or lower.

If the content of the acid compound is excessively low, the ink composition printed on it may not develop color sufficiently. Meanwhile, if the acid compound is contained excessively, the acidity may become too strong, or it may take a longer time for the free organic acid to evaporate after printing and free acid in the printed text or images to disappear. Also, when the boiling point of the organic acid is 120° C. or lower, in particular, an effect of shortening the time needed for the free organic acid to evaporate after printing and free acid in the printed text or images to disappear can be expected.

(Surfactant)

The pretreatment solution may or may not contain a surfactant. Among the surfactants that can be contained, nonionic-based surfactants are preferred. In particular, acetylene-based surfactants are preferred.

The content of the surfactant is, for example, 0 to 1.0% by mass, or preferably 0.01 to 1.0% by mass, or more preferably 0.1 to 0.7% by mass, relative to the entire pretreatment solution.

The nonionic-based surfactants are selected from silicone-based surfactants, fluorine-based surfactants, and acetylene-based surfactants. Also, for these surfactants, the aforementioned surfactants that can be blended in the ink composition may be used independently.

(Solvent)

For the pretreatment solution under the present invention, water alone, or a mixed solvent of water and water-soluble organic solvent, may be adopted as a solvent.

This water-soluble organic solvent may be, for example, a monohydric alcohol, trihydric alcohol, dihydric alcohol, tetrahydric or higher polyhydric alcohol, lower alkyl ether of polyhydric alcohol, ketone, ether, ester, nitrogen-containing compound, etc., that may be used in the ink composition described above. Any of the foregoing may be used alone, or two or more types may be combined. Also, this water-soluble organic solvent may be the same as, or different from, the water-soluble organic solvent used in the aforementioned ink composition.

Preferably the content of the water-soluble organic solvent is kept to a minimum, or none may be blended in.

If a solvent is blended in, its content is preferably 0 to 10.0% by mass, or more preferably 0 to 5.0% by mass, in the pretreatment solution. A content exceeding 10.0% by mass leads to drying problems and lower anti-blocking property.

(pH-Adjusting Agent)

The pretreatment solution under the present invention may or may not contain a pH-adjusting agent.

The pH-adjusting agent may be constituted by a basic water-soluble multivalent metal salt as described below, where ammonia, methylamine, ethylamine, dimethylamine, trimethylamine, diethylamine, triethylamine, triethanolamine, etc., may be adopted. In particular, organic basic substances are preferred, and ammonia is more preferred.

If a pH-adjusting agent is blended in, its content is preferably 0 to 10.0% by mass, or more preferably 0 to 5.0% by mass, or yet more preferably 0 to 3.0% by mass, or most preferably 0 to 1.0% by mass.

The basic water-soluble multivalent metal salt that constitutes the pH-adjusting agent is a salt of an organic acid or inorganic acid of a multivalent metal (note that this organic acid is one having a boiling point exceeding 120° C.) whose solubility in 100 mL of water at 20° C. is 1 g/100 mL or higher, or preferably 2 g/100 mL or higher, or more preferably 20 g/100 mL or higher.

The water-soluble multivalent metal salt may be a complex salt containing a multivalent metal, or hydrate thereof.

The multivalent metals include, for example, one type, or two or more types, selected from magnesium, calcium, strontium, zinc, copper, iron, and aluminum.

The organic acids with which to constitute a water-soluble multivalent metal salt include, for example, one type, or two or more types, of fatty acids expressed by RCOOH (in the formula, R represents an organic group with 1 to 30 carbon atoms). Such organic acids include acetic acid, propionic acid, octylic acid, lauric acid, myristic acid, pentadecylic acid, palmitic acid, margaric acid, stearic acid, 12-hydroxystearic acid, recinoleic acid, oleic acid, vaccenic acid, linoleic acid, linolenic acid, arachidic acid, behenic acid, lignoceric acid, cerotic acid, montanic acid, melissic acid, lactic acid, citric acid, gluconic acid, malic acid, tartaric acid, succinic acid, malonic acid, glutaric acid, maleic acid, fumaric acid, glutaconic acid, benzoic acid, ascorbic acid, etc.

The inorganic acids include, for example, one type, or two or more types, selected from nitric acid, sulfuric acid, hydrogen chloride (hydrochloric acid), hydrogen bromide, hydrogen iodide, chloric acid, bromic acid, carbonic acid, phosphoric acid, etc.

The water-soluble multivalent metal salts, which are multivalent metal salts of organic acids, include, for example, one type, or two or more types, selected from zinc acetate, calcium acetate, strontium acetate, magnesium acetate, zinc formate, calcium formate, strontium formate, copper (II) formate, magnesium formate, calcium benzoate, magnesium benzoate, zinc benzoate, calcium lactate, magnesium lactate, aluminum lactate, iron (II) lactate, copper lactate, calcium ascorbate, magnesium ascorbate, calcium propionate, magnesium propionate, calcium gluconate, magnesium gluconate, zinc gluconate, copper gluconate, zinc citrate, copper citrate, and hydrates thereof.

Also, the water-soluble multivalent metal salts, which are multivalent metal salts of inorganic acids, include, for example, one type, or two or more types, selected from zinc chloride, aluminum chloride, calcium chloride, strontium chloride, iron chloride, copper (II) chloride, nickel chloride, magnesium chloride, manganese (II) chloride, zinc bromide, calcium bromide, strontium bromide, iron (II) bromide, copper (II) bromide, magnesium bromide, zinc iodide, calcium iodide, magnesium iodide, aluminum nitrate, calcium nitrate, strontium nitrate, iron (III) nitrate, copper (II) nitrate, magnesium nitrate, zinc sulfate, aluminum sulfate, iron (II) sulfate, iron (III) sulfate, copper sulfate, magnesium sulfate, potassium aluminum sulfate, calcium dihydrogen phosphate, calcium hydrogen carbonate, and hydrates thereof.

(Other Components)

Furthermore, just like in the aqueous inkjet ink composition for textile printing, surfactants, preservatives, UV absorbents, antioxidants, defoaming agents, storability improving agents, antifungal agents, rustproofing agents, thickening agents, humectants, etc., may be contained in the pretreatment solution.

(Method for Preparing Pretreatment Agent)

The method for preparing the pretreatment agent under the present invention is not specifically limited. Simply the aforementioned components can be added in order, or all at once, and mixed together under agitation.

[Ink Set]

The ink set proposed by the present invention consists of any desired combination of the aforementioned pretreatment solution and ink composition. The combination of the pretreatment solution and ink composition in the ink set is not specifically limited, and for the color, etc., of the ink composition, the type of color, amount, etc., can be determined as desired.

[Printing Target]

The printing target to be treated with the ink composition proposed by the present invention is any of various types of papers or textile products that are widely known as being printed or textile-printed by ink compositions for textile printing. The textile products include cloths, fabrics, garments, etc.

The types of fibers in the textile products are not specifically limited and include fibers selected from the group that consists of polyester, cellulose, polymethyl methacrylate and other acrylic resins, nylon and other polyamide resins, and natural fibers, as well as blended fibers thereof. The polyester fibers include fibers whose primary component is polyethylene terephthalate. The cellulose fibers include cotton, tree cotton, linen, rayon, triacetate fibers, diacetate fibers, etc. The polyamide fibers include nylon fibers etc. Additionally, the natural fibers include silk, wool, etc.

Method for Printing Using Aqueous Inkjet Ink Composition for Textile Printing Proposed by Present Invention The method for printing using the aqueous inkjet ink composition for textile printing proposed by the present invention may be a method whereby inkjet printing is performed in a manner allowing the pretreatment solution and ink composition to contact each other in liquid state. The "in a manner allowing . . . to contact each other in liquid state" means performing a wet-on-wet printing where, after the pretreatment solution has been applied on the printing target surface, the aqueous inkjet ink composition for textile printing is printed using an inkjet printing device while the pretreatment solution on the application surface is not yet dry, or still remains in liquid state.

And, dispensing onto a base material (printing of images) can be performed by supplying the ink composition proposed by the present invention to a low-viscosity-accommodating printer head of an inkjet recording printer, and dispensing the ink composition from the printer head on the base material in a manner that the film thickness of a coating film reaches 1 to 60 μm for example. For the inkjet recording printer device with which to print the ink composition proposed by the present invention, any conventionally used inkjet recording printer device may be utilized.

The method for printing and curing the aqueous inkjet ink composition for textile printing proposed by the present invention may specifically be one whereby the coating film of the ink composition proposed by the present invention that has landed on the printing target surface is heated and thereby cured.

For the device used for curing by heating, any known device designed for curing heat-curable ink compositions may be adopted. The heat source may be infrared rays, electrically-heated wires, irons or other devices that heat the base material by directly contacting it, or a device that uses a heating source that does not contact the base material such as irradiation from an infrared lamp or electrically-heated wire.

EXAMPLES

The present invention is explained in greater detail below using examples; however, the present invention is not limited to these examples alone. It should be noted that, unless otherwise specified, "%" refers to "% by mass," while "part" refers to "part by mass." In addition, the numbers indicating the amounts of the respective materials in the tables also represent "parts by mass."

Table 1 below shows the compounding examples of aqueous inkjet ink compositions for textile printing, while Table 2 shows the evaluation results of the Examples and Comparative Examples.

[Preparation of Pretreatment Solutions]

(Pretreatment Solution A)

5.0 parts of formic acid and 0.2 parts of SURFYNOL 440 (acetylenediol-based surfactant, HLB=8, EVONIK Industries AG) were added to 94.8 parts of water and the mixture was agitated, to obtain pretreatment solution A.

(Pretreatment Solution B)

5.0 parts of calcium formate and 0.2 parts of SURFYNOL 440 (acetylenediol-based surfactant, HLB=8, EVONIK Industries AG) were added to 94.8 parts of water and the mixture was agitated, to obtain pretreatment solution B.

[Preparation of Ink Compositions]

(Aqueous Acrylic Resin Varnish)

25 parts of an acrylic acid/lauryl acrylate/styrene copolymer of 30,000 in weight-averaged molecular weight and 220 mgKOH/g in acid value were dissolved in a mixed solution consisting of 3.5 parts of potassium hydroxide and 71.5 parts of water, to obtain an aqueous acrylic resin varnish representing an alkali-soluble resin solution of 25% in solids content.

(Pigments)

Titanium oxide (product name TIPAQUE CR-90, alumina silica-treated, average primary particle size 0.25 μm, oil absorptivity 21 mL/100 g, Ishihara Sangyo Kaisha Ltd.)

Blue pigment (C. I. Pigment Blue 15:3)

Yellow pigment (C. I. Pigment Yellow 14)

Red pigment (C. I. Pigment Red 122)

Black pigment (C. I. Pigment Black 7)

(Preparation of Aqueous White Ink Base)

19 parts of water were added to and mixed with 36 parts of the aqueous acrylic resin varnish, to which 45 parts of titanium oxide were added, further followed by mixing under agitation, after which the mixture was kneaded using a wet circulation mill, to obtain an aqueous white ink base.

(Preparation of Aqueous Blue Ink Base)

64 parts of water were added to and mixed with 16 parts of the aqueous acrylic resin varnish, to which 20 parts of blue pigment were added, further followed by mixing under agitation, after which the mixture was kneaded using a wet circulation mill, to obtain an aqueous blue ink base.

(Preparation of Aqueous Yellow Ink Base)

64 parts of water were added to and mixed with 16 parts of the aqueous acrylic resin varnish, to which 20 parts of yellow pigment were added, further followed by mixing under agitation, after which the mixture was kneaded using a wet circulation mill, to obtain an aqueous yellow ink base.

(Preparation of Aqueous Red Ink Base)

64 parts of water were added to and mixed with 16 parts of the aqueous acrylic resin varnish, to which 20 parts of red pigment were added, further followed by mixing under agitation, after which the mixture was kneaded using a wet circulation mill, to obtain an aqueous red ink base.

(Preparation of Aqueous Black Ink Base)

64 parts of water were added to and mixed with 16 parts of the aqueous acrylic resin varnish, to which 20 parts of black pigment were added, further followed by mixing under agitation, after which the mixture was kneaded using a wet circulation mill, to obtain an aqueous black ink base.

(Ink Compositions)

The components of ink compositions used in Table 1 below are as follows.

Aqueous acrylic resin varnish (the same varnish as the aqueous acrylic resin varnish used in the preparation of the ink base of each color (solids content 25%))

IMPRANIL DLP-R: Sulfonic acid-modified polyester polyurethane resin emulsion, solids content 50%, 100% modulus 0.9 MPa, Sumika Covestro Urethane Co., Ltd.

IMPRANIL DLN-W50: Anionic polyester polyurethane resin emulsion, solids content 50%, 100% modulus 1.7 MPa, Sumika Covestro Urethane Co., Ltd.

IMPRANIL DLU: Anionic polyester/polycarbonate polyurethane resin emulsion, solids content 60%, 100% modulus 2.0 MPa, Sumika Covestro Urethane Co., Ltd.

MOWINYL 966A: Styrene-acrylic-based resin emulsion, solids content 45%, Japan Coating Resin Corporation BAYHYDUR BL2867: Hydroxyl group-containing blocked isocyanate-based crosslinking agent, solids content 38%, Covestro AG EPOCROS WS-700: Carboxyl group-containing oxazoline-based crosslinking agent, solids content 25%, Nippon Shokubai Co., Ltd.

CARBODILITE V-02: Polycarbodiimide resin, solids content 40%, Nisshinbo Chemical Inc.

E1010: OLFINE E1010: Polyoxyethylene (10) acetylenic glycol ether, Nissin Chemical Co., Ltd.

(Printing of White Ink Compositions)

Pretreatment solution A or B was applied to 800 g/m$^2$ on black cloths made of 100% polyester and 100% cotton, respectively, to obtain print media. On these print media, solid images were printed using an evaluation printer equipped with a Spectra head and the ink compositions for inkjet textile printing based on ink compositions 1 to 12 and 17 to 25, after which the print media were heated for 12 minutes at a temperature of 110° C. using a conveyor oven, to obtain the printed textile products in Examples 1 to 13 and Comparative Examples 1 to 9 using the respective white ink compositions.

(Printing of Colored Ink Compositions)

Pretreatment solution A was applied to 800 g/m$^2$ on black cloths made of 100% polyester and 100% cotton, respectively, to obtain print media. On these print media, solid images were printed using an evaluation printer equipped with a Spectra head and the white ink composition for inkjet textile printing based on ink composition 1, on which solid images the colored ink compositions for inkjet textile printing based on ink compositions 13 to 16 were printed, after which the print media were heated for 12 minutes at a temperature of 110° C. using a conveyor oven, to obtain the printed textile products in Examples 14 to 17 using the respective colored ink compositions.

Also, pretreatment solution A was applied to 800 g/m$^2$ on white cloths made of 100% polyester (polyester white) and 100% cotton (cotton white), respectively, to obtain print media. On these print media, solid images were printed using an evaluation printer equipped with a Spectra head and the colored ink compositions for inkjet textile printing based on ink compositions 13 to 20, after which the print media were heated for 12 minutes at a temperature of 110° C. using a conveyor oven, to obtain the printed textile products in Examples 18 to 25 using the respective colored ink compositions.

[Methods for Evaluation]

(Evaluation of Inkjet Discharge Property)

Continuous printing was performed using the aforementioned printer and the aqueous inkjet ink compositions for textile printing in Examples 1 to 17 and Comparative Examples 1 to 9, to evaluate discharge stability based on the criteria below.

◎: No discharge problems are observed on all nozzles during 1 hour or more of actual continuous printing operation.

○: There are nozzles that present discharge problems during 1 hour or more of actual continuous printing operation.

Δ: There are nozzles that fail to discharge during 15 minutes or more but less than 1 hour of actual continuous printing operation.

X: All nozzles fail to discharge during less than 1 hour of actual continuous printing operation.

(Image Density of White Ink-Printed Textile Products)

The printed textile products in Examples 1 to 13 and Comparative Examples 1 to 9 were measured for brightness (L*) using a spectrocolorimeter (product name X-Rite eXact (X-Rite, Inc.)), and the result was evaluated according to the criteria below.

◎: The L* is 90 or higher.

○: The L* is 80 or higher but under 90.

Δ: The L* is 60 or higher but under 80.

X: The L* is under 60.

(Image Density of Colored Ink-Printed Textile Products)

The printed textile products in Examples 14 to 17 were measured for optical density (OD) using a spectrocolorimeter (product name X-Rite eXact (X-Rite, Inc.)), and the result was evaluated according to the criteria below.

⊚: The OD is 1.0 or higher.

○: The OD is 0.8 or higher but under 1.0.

Δ: The OD is 0.6 or higher but under 0.8.

X: The OD is under 0.6.

(Washing Fastness)

The printed textile products of polyester and cotton in Examples 1 to 17 and Comparative Examples 1 to 9 were each washed normally in a home washing machine (washing conditions: wash in normal mode→spin→dry) 10 times. The rate of change in the brightness (L*) or optical density (OD) of each printed textile product from before, to after, washing was measured using a spectrocolorimeter (product name X-Rite eXact (X-Rite, Inc.)), or specifically the rate of change in brightness (L*) or optical density (OD) from the initial value before washing was measured, and the result was evaluated according to the criteria below.

⊚: The image density remains 90% or higher of the initial value after washing.

○: The image density is 80% or higher but under 90% of the initial value after washing.

Δ: The image density is 70% or higher but under 80% of the initial value after washing.

X: The image density is under 70% of the initial value after washing.

(Bleeding)

The printed textile products in Examples 18 to 25 were visually checked for the boundaries of printed and non-printed areas, to evaluate bleeding according to the criteria below.

○: There is no bleeding.

Δ: There is slight bleeding.

X: There is significant bleeding and images are not discerned.

TABLE 1

|  |  | Ink compositions | | | | | | | |
|---|---|---|---|---|---|---|---|---|---|
|  |  | 1 | 2 | 3 | 4 | 5 | 6 | 7 | 8 |
| Ink bases | Aqueous white ink base | 15.0 | 15.0 | 15.0 | 15.0 | 15.0 | 15.0 | 15.0 | 15.0 |
|  | Aqueous blue ink base |  |  |  |  |  |  |  |  |
|  | Aqueous yellow ink base |  |  |  |  |  |  |  |  |
|  | Aqueous red ink base |  |  |  |  |  |  |  |  |
|  | Aqueous black ink base |  |  |  |  |  |  |  |  |
| Water-dispersible resins | Impranil DLP-R | 35.0 |  |  |  |  | 35.0 | 35.0 | 35.0 |
|  | Impranil DLN-W50 |  | 35.0 |  |  |  |  |  |  |
|  | Impranil DLU |  |  | 29.2 |  |  |  |  |  |
| Crosslinking agent | Bayhydur BL2867 | 2.5 | 2.5 | 2.5 | 10.0 | 1.0 | 2.5 | 2.5 | 2.5 |
| Solvents B1 | Glycerin (boiling point 290° C.) | 10.0 | 10.0 | 10.0 | 10.0 | 10.0 |  | 10.0 | 17.0 |
|  | Triethylene glycol (boiling point 287° C.) |  |  |  |  |  | 10.0 |  |  |
| Solvents B2 | Propylene glycol (boiling point 187° C.) | 10.0 | 10.0 | 10.0 | 10.0 | 10.0 | 10.0 |  | 3.0 |
|  | Ethylene glycol (boiling point 198° C.) |  |  |  |  |  |  | 10.0 |  |
|  | Dipropylene glycol dimethyle ther (boiling point 187° C.) | 3.0 | 3.0 | 3.0 | 3.0 | 3.0 | 3.0 | 3.0 | 3.0 |
|  | Diethylene glycol ethyl methyl ether (boiling point 176° C.) |  |  |  |  |  |  |  |  |
| Surfactant | E1010 | 0.4 | 0.4 | 0.4 | 0.4 | 0.4 | 0.4 | 0.4 | 0.4 |
|  | Water | 24.1 | 24.1 | 29.9 | 51.6 | 60.6 | 24.1 | 24.1 | 24.1 |
|  | Total | 100.0 | 100.0 | 100.0 | 100.0 | 100.0 | 100.0 | 100.0 | 100.0 |
|  | Solvent B1/solvent B2 | 0.77 | 0.77 | 0.77 | 0.77 | 0.77 | 0.77 | 0.77 | 2.83 |

|  |  | Ink compositions | | | | | | | |
|---|---|---|---|---|---|---|---|---|---|
|  |  | 9 | 10 | 11 | 12 | 13 | 14 | 15 | 16 |
| Ink bases | Aqueous white ink base | 15.0 | 15.0 | 15.0 | 15.0 |  |  |  |  |
|  | Aqueous blue ink base |  |  |  |  | 5.0 |  |  |  |
|  | Aqueous yellow ink base |  |  |  |  |  | 5.0 |  |  |
|  | Aqueous red ink base |  |  |  |  |  |  | 5.0 |  |
|  | Aqueous black ink base |  |  |  |  |  |  |  | 5.0 |
| Water-dispersible resins | Impranil DLP-R | 35.0 | 35.0 | 35.0 | 35.0 | 35.0 | 35.0 | 35.0 | 35.0 |
|  | Impranil DLN-W50 |  |  |  |  |  |  |  |  |
|  | Impranil DLU |  |  |  |  |  |  |  |  |
| Crosslinking agent | Bayhydul BL2867 | 2.5 | 2.5 | 2.5 | 2.5 | 2.5 | 2.5 | 2.5 | 2.5 |
| Solvents B1 | Glycerin (boiling point 290° C.) | 6.0 | 10.0 | 10.0 | 10.0 | 10.0 | 10.0 | 10.0 | 10.0 |
|  | Triethylene glycol (boiling point 287° C.) |  |  |  |  |  |  |  |  |

TABLE 1-continued

| | | | | | | | | | |
|---|---|---|---|---|---|---|---|---|---|
| Solvents B2 | Propylene glycol (boiling point 187° C.) | 14.0 | 10.0 | 10.0 | 10.0 | 10.0 | 10.0 | 10.0 | 10.0 |
| | Ethylene glycol (boiling point 198° C.) | | | | | | | | |
| | Dipropylene glycol dimethyl ether (boiling point 187° C.) | 3.0 | 5.0 | 1.0 | | 3.0 | 3.0 | 3.0 | 3.0 |
| | Diethylene glycol ethyl methyl ether (boiling point 176° C.) | | | | 3.0 | | | | |
| Surfactant | E1010 | 0.4 | 0.4 | 0.4 | 0.4 | 0.4 | 0.4 | 0.4 | 0.4 |
| | Water | 24.1 | 22.1 | 26.1 | 24.1 | 34.1 | 34.1 | 34.1 | 34.1 |
| | Total | 100.0 | 100.0 | 100.0 | 100.0 | 100.0 | 100.0 | 100.0 | 100.0 |
| | Solvent B1/solvent B2 | 0.35 | 0.67 | 0.91 | 0.77 | 0.77 | 0.77 | 0.77 | 0.77 |

| | | Ink compositions | | | |
|---|---|---|---|---|---|
| | | 17 | 18 | 19 | 20 |
| Ink bases | Aqueous blue ink base | 5.0 | | | |
| | Aqueous yellow ink base | | 5.0 | | |
| | Aqueous red ink base | | | 5.0 | |
| | Aqueous black ink base | | | | 5.0 |
| Alkali-soluble resin | Aqueous acrylic resin varnish (solids content 25%) | 1.2 | 1.2 | 1.2 | 1.2 |
| Water-dispersible resins | Impranil DLP-R | 35.0 | 35.0 | 35.0 | 35.0 |
| | Impranil DLN-W50 | | | | |
| | Impranil DLU | | | | |
| Crosslinking agent | Bayhydul BL2867 | 2.5 | 2.5 | 2.5 | 2.5 |
| Solvents B1 | Glycerin (boiling point 290° C.) | 10.0 | 10.0 | 10.0 | 10.0 |
| | Triethylene glycol (boiling point 287° C.) | | | | |
| Solvents B2 | Propylene glycol (boiling point 187° C.) | 10.0 | 10.0 | 10.0 | 10.0 |
| | Ethylene glycol (boiling point 198° C.) | | | | |
| | Dipropylene glycol dimethyl ether (boiling point 187° C.) | 3.0 | 3.0 | 3.0 | 3.0 |
| | Diethylene glycol ethyl methyl ether (boiling point 176° C.) | | | | |
| Surfactant | E1010 | 0.4 | 0.4 | 0.4 | 0.4 |
| | Water | 32.9 | 32.9 | 32.9 | 32.9 |
| | Total | 100 | 100 | 100 | 100 |
| | Solvent B1/solvent B2 | 0.77 | 0.77 | 0.77 | 0.77 |

| | | Ink compositions | | | | | | | | |
|---|---|---|---|---|---|---|---|---|---|---|
| | | 21 | 22 | 23 | 24 | 25 | 26 | 27 | 28 | 29 |
| Ink base | Aqueous white ink base | 15.0 | 15.0 | 15.0 | 15.0 | 15.0 | 15.0 | 15.0 | 15.0 | 15.0 |
| Water-dispersible resins | Impranil DLP-R | | 35.0 | 35.0 | 35.0 | 35.0 | 35.0 | 35.0 | 35.0 | 35.0 |
| | MOWINYL 966A | 38.9 | | | | | | | | |
| Crosslinking agents | Bayhydul BL2867 | 2.5 | | 15.0 | | | 2.5 | 2.5 | 2.5 | 2.5 |
| | EPOCROS WS-700 | | | | 3.8 | | | | | |
| | CARBODILITE V-02 | | | | | 2.5 | | | | |
| Solvent B1 | Glycerin (boiling point 290° C.) | 10.0 | 10.0 | 10.0 | 10.0 | 10.0 | 20.0 | 4.0 | 10.0 | 10.0 |
| Solvents B2 | Polypropylene glycol (boiling point 187° C.) | 10.0 | 10.0 | 10.0 | 10.0 | 10.0 | | 16.0 | 10.0 | 7.0 |
| | Dipropylene glycol dimethyl ether (boiling point 187° C.) | 3.0 | 3.0 | 3.0 | 3.0 | 3.0 | 3.0 | 3.0 | | 7.0 |
| Surfactant | E1010 | 0.4 | 0.4 | 0.4 | 0.4 | 0.4 | 0.4 | 0.4 | 0.4 | 0.4 |
| | Water | 20.2 | 26.6 | 11.6 | 22.8 | 24.1 | 24.1 | 24.1 | 27.1 | 23.1 |
| | Total | 100.0 | 100.0 | 100.0 | 100.0 | 100.0 | 100.0 | 100.0 | 100.0 | 100.0 |
| | Solvent B1/solvent B2 | 0.77 | 0.77 | 0.77 | 0.77 | 0.77 | 6.67 | 0.21 | 1.00 | 0.71 |

23

TABLE 2

|  |  | Examples | | | | | | | | |
|---|---|---|---|---|---|---|---|---|---|---|
|  |  | 1 | 2 | 3 | 4 | 5 | 6 | 7 | 8 | 9 |
| | Ink composition | 1 | 1 | 2 | 3 | 4 | 5 | 6 | 7 | 8 |
| | Pretreatment solution | A | B | A | A | A | A | A | A | A |
| Evaluation results | Discharge property | ◎ | ◎ | ◎ | ◎ | ○ | ◎ | ◎ | ◎ | ◎ |
| | Image density (polyester black) | ◎ | ◎ | ◎ | ◎ | ◎ | ◎ | ◎ | ◎ | ◎ |
| | Washing fastness (polyester black) | ◎ | ○ | ◎ | ○ | ◎ | ◎ | ◎ | ◎ | ○ |
| | Image density (cotton black) | ◎ | ◎ | ◎ | ◎ | ◎ | ◎ | ◎ | ◎ | ◎ |
| | Washing fastness (cotton black) | ◎ | ○ | ◎ | ○ | ◎ | ○ | ◎ | ◎ | ○ |

|  |  | Examples | | | | | | | |
|---|---|---|---|---|---|---|---|---|---|
|  |  | 10 | 11 | 12 | 13 | 14 | 15 | 16 | 17 |
| | Ink composition | 9 | 10 | 11 | 12 | 13 | 14 | 15 | 16 |
| | Pretreatment solution | A | A | A | A | A | A | A | A |
| Evaluation results | Discharge property | ○ | ○ | ◎ | ◎ | ◎ | ◎ | ◎ | ◎ |
| | Image density (polyester black) | ◎ | ◎ | ◎ | ◎ | ◎ | ◎ | ◎ | ◎ |
| | Washing fastness (polyester black) | ◎ | ◎ | ○ | ◎ | ◎ | ◎ | ◎ | ◎ |
| | Image density (cotton black) | ◎ | ◎ | ◎ | ◎ | ◎ | ◎ | ◎ | ◎ |
| | Washing fastness (cotton black) | ◎ | ◎ | ○ | ◎ | ◎ | ◎ | ◎ | ◎ |

|  |  | Examples | | | | | | | |
|---|---|---|---|---|---|---|---|---|---|
|  |  | 18 | 19 | 20 | 21 | 22 | 23 | 24 | 25 |
| | Ink composition | 13 | 14 | 15 | 16 | 17 | 18 | 19 | 20 |
| | Pretreatment solution | A | A | A | A | A | A | A | A |
| Evaluation results | Discharge property | ◎ | ◎ | ◎ | ◎ | ◎ | ◎ | ◎ | ◎ |
| | Image density (polyester white) | ◎ | ◎ | ◎ | ◎ | ◎ | ◎ | ◎ | ◎ |
| | Washing fastness (polyester white) | ◎ | ◎ | ◎ | ◎ | ◎ | ◎ | ◎ | ◎ |
| | Bleeding (polyester white) | △ | △ | △ | △ | ○ | ○ | ○ | ○ |
| | Image density (cotton white) | ◎ | ◎ | ◎ | ◎ | ◎ | ◎ | ◎ | ◎ |
| | Washing fastness (cotton white) | ◎ | ◎ | ◎ | ◎ | ◎ | ◎ | ◎ | ◎ |
| | Bleeding (cotton white) | △ | △ | △ | △ | ○ | ○ | ○ | ○ |

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| | Ink composition | 21 | 22 | 23 | 24 | 25 | 26 | 27 | 28 | 29 |
| | Pretreatment solution | A | A | A | A | A | A | A | A | A |
| Evaluation results | Discharge property | ◎ | ◎ | X | ◎ | ◎ | ◎ | X | ◎ | X |
| | Image density (polyester black) | ◎ | ◎ | ◎ | ◎ | ◎ | ◎ | ◎ | ◎ | ◎ |
| | Washing fastness (polyester black) | X | ◎ | ◎ | ○ | △ | X | ◎ | X | ◎ |
| | Image density (cotton black) | ◎ | ◎ | ◎ | ◎ | ◎ | ◎ | ◎ | ◎ | ◎ |
| | Washing fastness (cotton black) | △ | X | ◎ | X | X | X | ◎ | △ | ◎ |

As shown by Examples 1 to 17 using the white ink compositions and colored ink compositions conforming to the present invention, the aqueous inkjet ink composition for textile printing proposed by the present invention, used together with an appropriate pretreatment agent, achieves excellent discharge property along with excellent image density and washing fastness when textile-printed on polyester and cotton.

In particular, Example 1 and Example 2 represent the same example except that the pretreatment solution is different. Similar effects could be demonstrated using either formic acid or calcium formate.

By contrast, according to Comparative Example 1 adopting a styrene-acrylic-based resin emulsion as the water-dispersible resin, washing fastness was lacking particularly on polyester and cotton. According to Comparative Example 2 not using any blocked isocyanate crosslinking agent, washing fastness was particularly lacking on cotton. Meanwhile, Comparative Example 3 containing a blocked isocyanate crosslinking agent excessively (15% by mass×38% by mass=5.7% by mass) resulted in poorer discharge property. Also, according to Comparative Examples 4 and 5 adopting a non-blocked-isocyanate crosslinking agent, washing fastness was lacking particularly on polyester and cotton.

Additionally, according to Comparative Example 6 not containing any dihydric alcohol as solvent B2 and having too high a value of B1/B2, washing fastness was lacking particularly on polyester and cotton. According to Comparative Example 7 with too low a value of B1/B2, discharge property was insufficient. According to Comparative Example 8 not containing any glycol ether as solvent B2, washing fastness was lacking particularly on polyester and cotton. According to Comparative Example 9 with an excessive content of glycol ether in solvent B2, discharge property was insufficient.

It should be noted that Examples 18 to 25 represent examples of using ink compositions 13 to 20. All of them demonstrated excellent discharge property. However, Examples 22 to 25 containing the aqueous acrylic resin varnish performed better than Examples 18 to 21 not containing the aqueous acrylic resin varnish, in that there was no bleeding on polyester white and cotton white.

What is claimed:

1. An ink set having a pretreatment solution and an aqueous inkjet ink composition for textile printing, wherein the pretreatment solution contains a nonionic-based surfactant, and
the aqueous inkjet composition contains A to E below:
A. a pigment;
B1. a solvent with a boiling point of 280° C. or higher;
B2. a glycol ether accounting for 0.1 to 6.0% by mass relative to a total amount of the aqueous inkjet ink composition for textile printing, and a dihydric alcohol, as solvents with a boiling point of 200° C. or lower;
wherein a ratio by mass of the solvent B1 and solvent B2, or B1/B2, is 0.3 to 3.0;
C. a polyurethane resin-based water-dispersible resin;
D. a surfactant; and
E. a blocked isocyanate crosslinking agent accounting for 0.1 to 5.0% by mass relative to a total amount of the aqueous inkjet ink composition for textile printing.

2. The ink set according to claim 1, wherein the aqueous inkjet ink composition contains glycerin as the solvent B1, and contains propylene glycol as the dihydric alcohol being the solvent B2 and/or dipropylene glycol dimethyl ether as the glycol ether being the solvent B2.

3. The ink set according to claim 1, wherein, in the aqueous inkjet ink composition, the polyurethane resin-based water-dispersible resin is a polyester-based polyurethane resin.

4. An inkjet printing method comprising:
treating a base material with the pretreatment solution of the ink set according to claim 1; and
printing the aqueous inkjet ink composition of the ink set according to claim 1 on the base material wherein the aqueous inkjet ink composition and the pretreatment solution contact each other in liquid state.

* * * * *